United States Patent
Frenne et al.

(10) Patent No.: US 10,771,960 B2
(45) Date of Patent: Sep. 8, 2020

(54) DELAYING TRANSMISSION DEPENDING ON TRANSMISSION TYPE AND UE PROCESSING CAPABILITIES

(71) Applicant: Telefonaktiebolaget LM Ericsson (publ), Stockholm (SE)

(72) Inventors: Mattias Frenne, Uppsala (SE); Håkan Andersson, Linköping (SE); Johan Furuskog, Stockholm (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/242,209

(22) Filed: Jan. 8, 2019

(65) Prior Publication Data
US 2019/0208408 A1    Jul. 4, 2019

Related U.S. Application Data

(63) Continuation of application No. 16/095,121, filed as application No. PCT/SE2016/051178 on Nov. 29, 2016.
(Continued)

(51) Int. Cl.
*H04W 8/22* (2009.01)
*H04L 1/18* (2006.01)
(Continued)

(52) U.S. Cl.
CPC ............. *H04W 8/22* (2013.01); *H04L 1/1819* (2013.01); *H04L 1/1896* (2013.01);
(Continued)

(58) Field of Classification Search
CPC ... H04L 1/1861; H04L 1/1887; H04L 1/1896; H04L 12/875; H04L 1/18; H04L 5/00;
(Continued)

(56) References Cited

U.S. PATENT DOCUMENTS 8,266,491 B2 * 9/2012 Lee ........................ H04L 1/1812
714/748
8,284,754 B2 * 10/2012 Chang ................... H04L 5/0055
370/350
(Continued)

FOREIGN PATENT DOCUMENTS

EP    2712257 A1    3/2014
EP    3407516 A1   11/2018
(Continued)

OTHER PUBLICATIONS

Unknown, Author, "Discussion on Frame Structure for NR", #GPP TSG RAN WG1 Meeting #84bis, R1-162519, Busan, Korea, Apr. 11-15, 2016, pp. 1-6.
(Continued)

*Primary Examiner* — Man U Phan
(74) *Attorney, Agent, or Firm* — Murphy, Bilak & Homiller, PLLC

(57) ABSTRACT

Embodiments herein relate to a method performed by a radio network node (12) for handling transmission of data from a wireless device (10) in a wireless communication network (1). The radio network node (12) determines a delay value for a transmission of data from the wireless device (10) based on a transmission type of data from the wireless device (10) or a capability of the wireless device (10). The capability is related to a processing time for processing received data from the radio network node (12), or for processing data for transmission to the radio network node. The radio network node further transmits an indication, to
(Continued)

the wireless device (10), which indication indicates the determined delay value.

26 Claims, 12 Drawing Sheets

Related U.S. Application Data

(60) Provisional application No. 62/324,914, filed on Apr. 20, 2016.

(51) Int. Cl.
| | |
|---|---|
| *H04L 5/00* | (2006.01) |
| *H04W 76/27* | (2018.01) |
| *H04W 28/02* | (2009.01) |
| *H04W 72/04* | (2009.01) |
| *H04W 72/12* | (2009.01) |
| *H04W 24/08* | (2009.01) |

(52) U.S. Cl.
CPC ........ *H04L 5/0055* (2013.01); *H04W 24/08* (2013.01); *H04W 28/0215* (2013.01); *H04W 72/042* (2013.01); *H04W 72/1231* (2013.01); *H04W 76/27* (2018.02)

(58) Field of Classification Search
CPC ........ H04W 56/0045; H04W 74/0833; H04W 8/22; H04W 72/04; H04W 76/27
USPC ........................................ 370/329, 336, 350
See application file for complete search history.

(56) References Cited

U.S. PATENT DOCUMENTS

| | | | |
|---|---|---|---|
| 8,542,615 B2 | 9/2013 | Gorokhov | |
| 8,737,348 B2 | 5/2014 | Oh | |
| 8,751,891 B2 * | 6/2014 | Park | H04L 1/1841 |
| | | | 714/749 |
| 8,989,010 B2 | 3/2015 | Beheshti-Zavareh et al. | |
| 9,414,378 B2 * | 8/2016 | Stanze | H04L 1/1887 |
| 9,451,571 B2 | 9/2016 | Lorenz et al. | |
| 9,642,034 B2 | 5/2017 | Zhu et al. | |
| 9,888,513 B2 * | 2/2018 | Iyer | H04W 28/08 |
| 9,894,679 B2 | 2/2018 | Huang et al. | |
| 9,929,834 B2 * | 3/2018 | Chen | H04L 1/1861 |
| 9,930,596 B2 | 3/2018 | Choi et al. | |
| 10,103,848 B2 * | 10/2018 | Frederiksen | H04W 72/1284 |
| 10,142,971 B2 * | 11/2018 | Hu | H04W 8/24 |
| 10,181,931 B2 | 1/2019 | Park et al. | |
| 2007/0249360 A1 | 10/2007 | Das et al. | |
| 2016/0262178 A1 | 9/2016 | Vangala et al. | |
| 2018/0020431 A1 * | 1/2018 | Cho | H04W 76/20 |
| 2018/0242319 A1 * | 8/2018 | Akkarakaran | H04W 72/12 |
| 2018/0287764 A1 * | 10/2018 | Hosseini | H04L 1/1854 |
| 2018/0302128 A1 * | 10/2018 | Akkarakaran | H04L 1/1822 |
| 2018/0368024 A1 * | 12/2018 | Cheng | H04L 5/14 |
| 2018/0376498 A1 * | 12/2018 | Bhattad | H04L 1/08 |

FOREIGN PATENT DOCUMENTS

| | | |
|---|---|---|
| RU | 2370914 C2 | 10/2009 |
| RU | 2536386 C2 | 12/2014 |
| WO | 2009134100 A2 | 11/2009 |
| WO | 2016175981 A1 | 11/2016 |
| WO | 2017123275 A1 | 7/2017 |

OTHER PUBLICATIONS

Unknown, Author, "Physical layer aspect of processing time for shortened TTI", 3GPP TSG RAN WG1 Meeting #84bis; R1-162511; Busan, Korea, Apr. 11-15, 2016, pp. 1-6 .

Unknown, Author, "Support different TTI length for data channels and PUCCH", 3GPP TSG RAN WG1 Meeting #84bis; R1-163101; Busan, Korea, Apr. 11-15, 2016, pp. 1-4.

\* cited by examiner

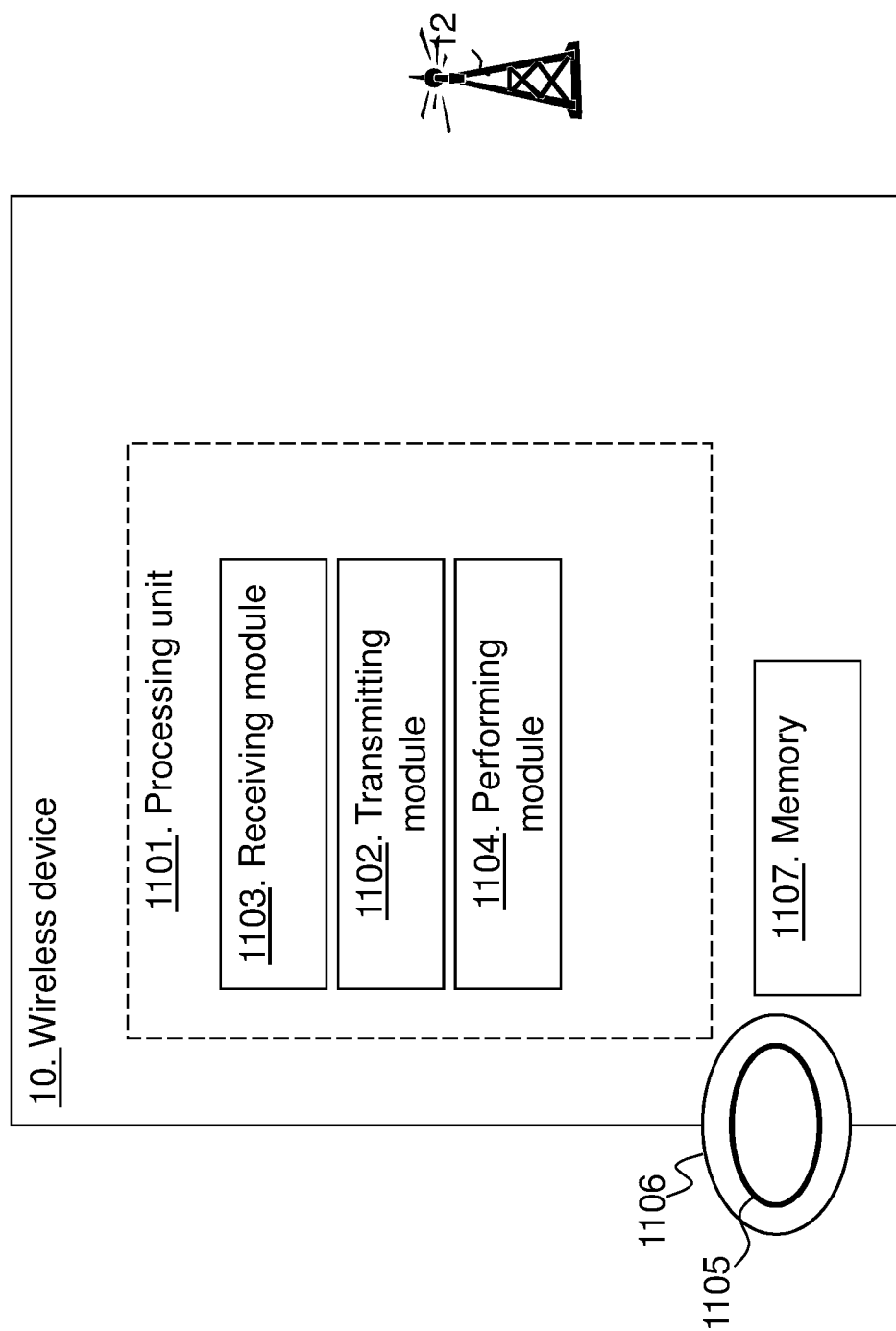

DELAYING TRANSMISSION DEPENDING ON TRANSMISSION TYPE AND UE PROCESSING CAPABILITIES

RELATED APPLICATIONS

The present application is a continuation of U.S. application Ser. No. 16/095,121, filed 19 Oct. 2018, which was the National Stage of International Application No. PCT/SE2016/051178, filed 29 Nov. 2016, which claims the benefit of U.S. provisional application Ser. No. 62/324,914, filed 20 Apr. 2016. The entire contents of each of U.S. application Ser. No. 16/095,121 and U.S. provisional application Ser. No. 62/324,914 is incorporated herein by reference.

TECHNICAL FIELD

Embodiments herein relate to a radio network node, a wireless device and methods performed therein. In particular, embodiments herein relate to handling communication of data, such as performing data transmission to or from the radio network node, in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain.

Advanced Antenna Systems (AASs) is an area where technology has advanced significantly in recent years and where we also foresee a rapid technology development in the years to come. Hence it is natural to assume that AASs in general and massive Multiple Input Multiple Output (MIMO) transmission and reception in particular will be a cornerstone in a future Fifth Generation (5G) system.

In relation to the AASs, beam-forming is becoming increasingly popular and capable and it is not only for transmission of data but also for transmission of control information. This is one motivation behind a control channel described in Long Term Evolution (LTE) known as Enhanced Physical Downlink Control Channel (ePDCCH). When the control channel is beam-formed, the cost of transmitting the overhead control information can be reduced due to the increased link budget provided by the additional antenna gain.

Automatic repeat-request (ARQ) is an error-control technique used in many wireless networks. With ARQ, a receiver of data transmissions sends acknowledgements (ACKs) or negative acknowledgments (NACKs) to inform the transmitter of whether each message has been correctly received. Incorrectly received messages, as well as messages that aren't acknowledged at all, can then be re-transmitted.

Hybrid ARQ (HARD) combines ARQ with forward error-correction (FEC) coding of the data messages, to improve the ability of the receiver to receive and correctly decode the transmitted messages. As with conventional ARQ, receivers employing HARQ send ACKs and NACKs, as appropriate, after each attempt to decode a message. These ACKs and NACKs are referred to as "HARQ feedback."

For downlink HARQ transmissions in LTE today, HARQ feedback is sent from the wireless device, e.g. a wireless device to the wireless communication Network (NW) on either Physical Uplink Control Channel (PUCCH) or Physical Uplink Shared Channel (PUSCH), depending on whether the wireless device has been scheduled for uplink PUSCH transmission or not. The NW can thereafter, on an individual HARQ process basis, draw conclusions on whether the last HARQ reception for that process was successful or not, e.g. based on received ACK/NACK, or even if the Downlink (DL) Assignment reception failed, i.e. the wireless device does not send any feedback also called Discontinuous Transmission (DTX).

The timing of the transmitted HARQ feedback in LTE is such that, for Frequency Division Duplexing (FDD), the feedback from one HARQ Receive (RX) process is received in the Uplink (UL) in subframe n+4 if the corresponding DL transmission for that process was in subframe n, corresponding to a delay of 4 milliseconds (ms) in total. Hence, there is a fixed timing relationship, also referred to as k_fix subframes, between the scheduling subframe, or Physical Downlink Shared Channel (PDSCH) subframe, to the uplink transmission, so no scheduling of HARQ-ACK is used. For example, in LTE FDD, a k_fix=4 subframe delay is used for ACK/NACK. For Time Division Duplexing (TDD), the delay from DL data transmission to UL feedback reception may be larger than four to cater for the half-duplex DL-UL split. Providing feedback and scheduling data transmissions as performed in prior art may limit the performance of the wireless communication network.

SUMMARY

An object herein is to provide a mechanism that improves performance of the wireless communication network during transmission of data.

According to embodiments herein the object is achieved by providing a method performed by a radio network node for handling transmission of data from a wireless device in a wireless communication network. The radio network node determines a delay value, such as a k-value, for a transmission of data from the wireless device based on a transmission type of data from the wireless device or a capability of the wireless device. The capability is related to a processing time for processing received data from the radio network node, or for processing data for transmission to the radio network node. The radio network node transmits an indication, to the wireless device, which indication indicates the determined delay value. The determined delay value may be a default value for the wireless device to use as default based on the transmission type of data from the wireless device, or, in some embodiments, the radio network node may receive, from the wireless device, a capability indication indicating the capability of the wireless device, and the determined delay value may be a dynamical or adjusted value based on the indicated capability of the wireless device.

According to embodiments herein the object is achieved by providing a method performed by a wireless device for handling a transmission of data in a wireless communication network. The wireless device receives an indication, e.g. the k-value or an index pointing to a k-value, from a radio network node. The indication indicates a delay value for a transmission of data from the wireless device based on a transmission type of data from the wireless device or a capability of the wireless device. The capability is related to a processing time for processing received data from the radio network node, or for processing data for transmission to the radio network node. The wireless device further performs a transmission of data to the radio network node delayed based on the received indication, or as indicated by the indication. The wireless device may in some embodiments further transmit a capability indication, e.g. a minimum k-value (min_k), indicating a capability of the wireless device, which capability is related to processing time for processing received data from the radio network node or processing time for processing data for transmission to the radio network node. Then, the wireless device receives i.e. gets configured with the delay value from the radio network node. The wireless device then performs the transmission of data delayed with the indicated delay value or at least with the indicated delay value, e.g. after receiving data from the radio network node such as receiving a DL data transmission or a grant for UL data transmission.

Additionally, a radio network node and a wireless device configured to perform the methods herein are also provided.

According to embodiments herein the object is further achieved by providing a radio network node for handling transmission of data from a wireless device in a wireless communication network. The radio network node is configured to determine a delay value for a transmission of data from the wireless device based on a transmission type of data from the wireless device or a capability of the wireless device. The capability is related to a processing time for processing received data from the radio network node, or for processing data for transmission to the radio network node. The radio network node is configured to transmit an indication, to the wireless device, which indication indicates the determined delay value.

According to embodiments herein the object is further achieved by providing a wireless device for handling a transmission of data in a wireless communication network. The wireless device is configured to receive an indication from a radio network node. The indication indicates a delay value for a transmission of data from the wireless device based on a transmission type of data from the wireless device or a capability of the wireless device. The capability is related to a processing time for processing received data from the radio network node, or for processing data for transmission to the radio network node. The wireless device is further configured to perform a transmission of data to the radio network node delayed based on the received indication.

It is furthermore provided herein a computer program comprising instructions, which, when executed on at least one processor, cause the at least one processor to carry out any of the methods above, as performed by the radio network node or the wireless device. It is additionally provided herein a computer-readable storage medium, having stored thereon a computer program comprising instructions which, when executed on at least one processor, cause the at least one processor to carry out the method according to any of the methods above, as performed by the radio network node or the wireless device.

Embodiments herein provide a manner of enabling scheduling data transmission in a wireless communication network in an efficient manner. By determining or dynamically changing the delay value for the transmission of data from the wireless device after receiving data from the radio network node one may adjust the transmission time based on the capability of the wireless devices and/or the transmission type of data and thus achieve an efficient way of transmitting data leading to an improved performance of the wireless communication network.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

Embodiments will now be described in more detail in relation to the enclosed drawings, in which:

FIG. 11 is a block diagram depicting a wireless device according to embodiments herein.

DETAILED DESCRIPTION

Figure 1:
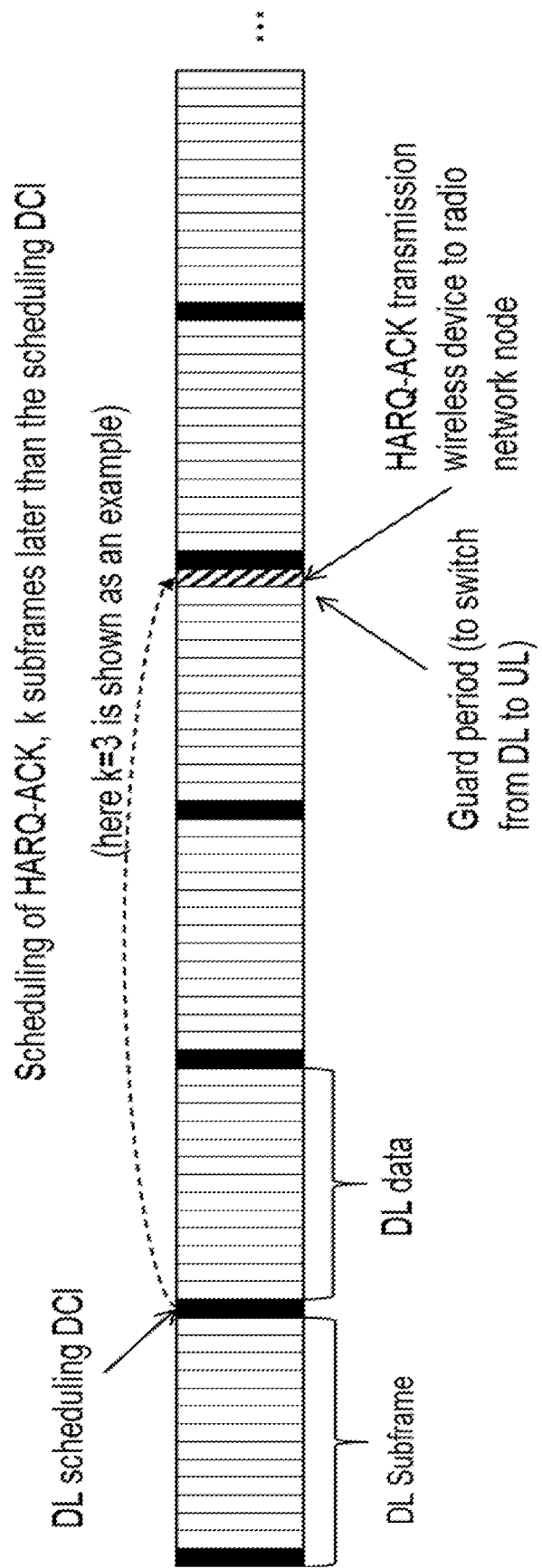
FIG. 1 is an overview of scheduling HARQ feedback in a subframe.

According to some embodiments herein, in uplink, e.g. in 5G, a dynamic or adjusted scheduling delay, k, indicating a time from a subframe where a scheduling message is received in the downlink to a subframe where an uplink transmission is transmitted, may be introduced, for example; indicating when DL HARQ-ACK, i.e. the ACK or NACK response from the wireless device which has received a DL data transmission, is scheduled by the radio network node, see example in FIG. 1, and when UL PUSCH is scheduled by the radio network node. The UL PUSCH may include a measurement report based on downlink channel state information reference signals (CSI-RS) transmitted in the downlink. In e.g. 5G, a DL scheduling Downlink Control Information (DCI) may be used to schedule an uplink transmission k subframes later. FIG. 1 shows a DL scheduling DCI sent in a DL subframe further carrying DL data. The DCI carries scheduling information and may be referred to as DL scheduling DCI. In the example, the scheduling of HARQ-ACK may be k subframes later than the DL scheduling DCI, k=3 is shown as an example. In the DL subframe there is a guard period to switch from DL to UL before the time slot for HARQ-ACK transmission from the wireless device to the radio network node. The value k may be variable, and may be included in the DCI, for example, 2 bits may be included in the DCI to indicate the value of k. The DL scheduling DCI may be a DL DCI, to schedule the DL data, or the UL DCI, to schedule the actual uplink transmission.

It is observed that a short value of the k is more demanding on the wireless device since the wireless device needs time to process the DL data transmissions and decide on either ACK or NACK, or the wireless device needs time to prepare e.g. encode, modulate, etc, an UL data transmission, but a short value of the k shortens the latency. If the UL transmission contains a measurement report, the wireless device also needs time to prepare the report. Different implementations will exist depending on the processing capability of the wireless device, according to embodiments herein it is thus suggested to introduce a delay value also referred to as minimum delay value, based on wireless device capability that the wireless device signals to the radio network node or a transmission type of data from the wireless device, e.g. being feedback transmission or UL data transmission.

Figure 2:
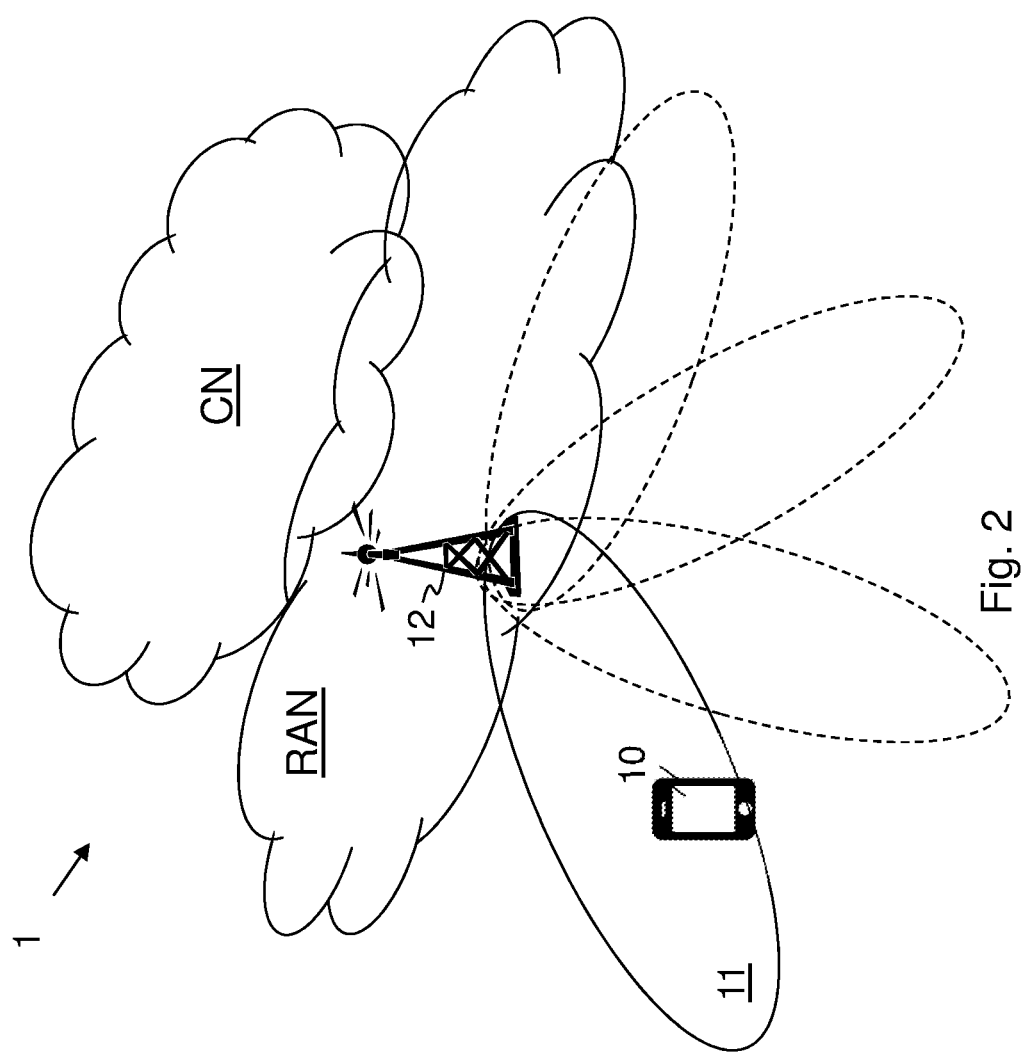
FIG. 2 is an overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) station (STA), a STA, a user equipment and/or a wireless terminals, communicate via one or more Access Networks (AN), e.g. RAN, to one or more core networks (CN) and/or other wireless devices. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communication network 1 comprises a radio network node 12 providing radio coverage over a geographical area, a service area 11, which may also be referred to as a beam or a beam group, of a first radio access technology (RAT), such as 5G, LTE, Wi-Fi or similar. The radio network node 12 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node 12 depending e.g. on the first radio access technology and terminology used. The radio network node 12 may be referred to as a serving radio network node and communicates with the wireless device 10 with Downlink (DL) transmissions to the wireless device 10 and Uplink (UL) transmissions from the wireless device 10.

As stated above embodiments herein relate to the introduction of a delay, referred to as delay value or minimum delay value, for scheduling PDSCH and PUSCH to/from the wireless device 10, and as part of developing embodiments herein one or more problems have been identified. For example, when the capability of the wireless device 10 is unknown to the radio network node 12 e.g. before the wireless device capability has been signaled to the radio network node 12 from the wireless device 10, the supported delay value is also unknown. Furthermore, even if the capabilities of the wireless devices are known, some downlink transmissions may be group transmissions, such as paging and broadcast of system information resulting in an insecurity in selecting an appropriate delay value. Embodiments herein solve at least one of these disadvantages by the introduction of communicating the determined delay value.

Figure 3A:
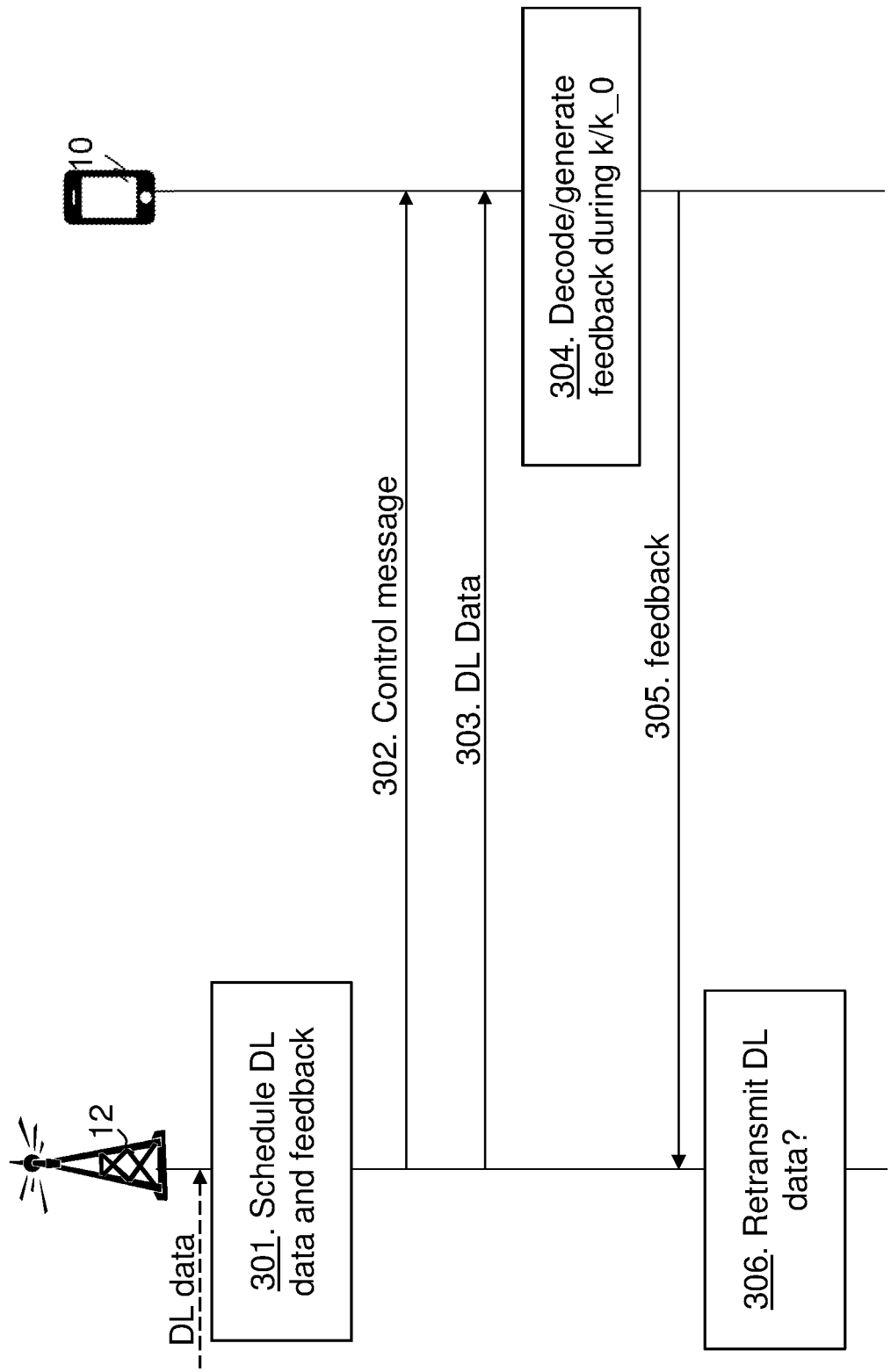
FIG. 3a is a combined flowchart and signalling scheme according to embodiments herein.

FIG. 3a is a combined flowchart and signaling scheme according to embodiments herein. Actions may be performed in any suitable order.

In this example, the radio network node 12 receives data intended for the wireless device 10. Hence, the radio network node 12 has data intended for the wireless device 10 to schedule as well as feedback of the data intended for the wireless device 10.

Action 301.

The radio network node 12 may schedule resources for DL transmissions, DL data, from the radio network node 12. Additionally, the radio network node 12 may further schedule resources for carrying feedback of the DL transmission from the radio network node 12. The scheduling is taking the delay value into account. The delay value may either by a default value, denoted as k_0 or k_min_0, or a dynamical or adjusted value, denoted k or k_min, taking capability of the wireless device 10 into account. The default value may depend on one or several of these parameters: The transmission type of message, e.g. HARQ-ACK, uplink transmission, Random Access Channel (RACH) response, dedicated system info, containing a measurement report, etc; The message payload being e.g. a table in a specification that describes the default value to use for different payload ranges such as up to 1000 bits, from 1001 bits up to 10000 bits, and so on; and a scheduling bandwidth e.g. a table in a specification that describe the default value to use for different scheduling bandwidths such as up to 6 Resource blocks (RB), from 7 RBs up to 100 RBs, and so on. Thus the default value may be considered a fixed value or a value that is dynamical as well. It should be noted that the message payload and scheduling bandwidth are also indications of the transmission type. The delay value being the dynamical value may depend on a scheduled bandwidth, e.g. number of RB, for the DL transmission. The dynamical value may be the time from the subframe containing the DL transmission, which is the same subframe containing DL DCI, to the subframe containing the feedback.

Action 302.

The radio network node 12 then transmits a control message or information, such as a DL grant, indicating scheduling of resources for carrying the data transmission over the channel to the wireless device 10 and/or feedback from the wireless device 10. The control message may thus additionally or alternatively indicate the scheduling of resources for feedback transmission of the data transmission from the radio network node 12. In some embodiments scheduling of feedback of data in the downlink is indicated in the control message with an indication of the delay value. The delay value indicates a time, also referred to as processing time, enabling the wireless device 10 to process the control message, decode the data, and/or generate feedback for the DL transmission.

Action 303.

The radio network node 12 may then transmit DL data to the wireless device 10 as scheduled.

Action 304.

The wireless device 10 detects and reads the control message, attempts to decode the received DL data and generates feedback regarding the decoding e.g. ACK in case of successful decoding, NACK in case of unsuccessful decoding of data and Discontinuous transmission (DTX), i.e. no transmission, in case of unsuccessful decoding/detection of the control message i.e. not detecting the control message. Thus, the wireless device 10 decodes and generates feedback during the delay value, e.g. the default value, k_0, or the adjusted value, k, signaled in the control message or a previous control message. The default value may be preconfigured at the wireless device 10.

Action 305.

The wireless device 10 then transmits the generated feedback as scheduled, e.g. based on the delay value indicated in the control message. Feedback indicators of the feedback may comprise one bit to indicate that the ACK/NACK is present and where, which resource elements, it is present may be given by e.g. standard.

Action 306.

The radio network node 12 may read the feedback information based on knowledge of the scheduled resources for the feedback. The radio network node 12 then determines whether to retransmit any DL data based on the read feedback.

This embodiment describes the HARQ-ACK transmission type but the same solution holds for other transmission types such a UL data transmissions over PUSCH.

A DCI bit field may be introduced in a DL data scheduling DCI message also referred to as a scheduling DCI message.

The DCI bit field represents the delay value e.g. denoted as k_HARQ_i, wherein i=0, 1, 2, 3, defining a subframe offset relative to the subframe for which the wireless device 10 receives the DCI, assuming an example of 4 values. See table A.

TABLE A

| DCI format Bit field | Scheduling delay k_HARQ |
| --- | --- |
| 00 | k_HARQ_0 |
| 01 | k_HARQ_1 |
| 10 | k_HARQ_2 |
| 11 | k_HARQ_3 |

The delay values or offsets related to the different indications, k-values, may be configured by higher layer signaling from the radio base station 12 or a core network node to the wireless device 10, for example using Radio Resource Control (RRC) signaling.

The radio network node 12 will not indicate a smaller k_HARQ_i in the scheduling DCI message than the wireless device 10 has capability to support. If a smaller offset is anyway received by the wireless device 10, the wireless device 10 may ignore the scheduling DCI message or feed back a NACK. Hence, the wireless device 10 may compare the indicated delay value from the radio network node 12 and compare it to its own capability of processing data within the delay value.

Before the radio network node 12 knows the capability of delay value of the wireless device 10, at least one of k_HARQ_i is assumed by the wireless device 10 to be larger or equal to the default value k_0. For example, k_HARQ_0 can have a default value given by specifications before capability of the wireless device 10 has been signalled and RRC configuration of the values k_HARQ_i has been configured.

Alternatively, a complete nominal table is used before capability of the wireless device 10 is signalled and RRC configuration of the table has been established. See table B or table C. In this case, table A may be used when capability of the wireless device 10 is known and scheduling delays k_HARQ_i, i=0, 1, 2, 3 has been configured by higher layers.

TABLE B

| DCI format Bit field | Scheduling delay k_HARQ |
| --- | --- |
| 00 | k_min_0 |
| 01 | N/A |
| 10 | N/A |
| 11 | N/A |

TABLE C

| DCI format Bit field | Scheduling delay k_HARQ |
| --- | --- |
| 00 | k_min_0 |
| 01 | k_min_0 + 1 |
| 10 | k_min_0 + 2 |
| 11 | k_min_0 + 3 |

Alternatively or additionally, a second or other DCI bit field is introduced in a scheduling DCI message. The second bit field may represent the adjusted or dynamic value k_dyn_i, i=0, 1, 2, or a subframe offset relative to the subframe for which the wireless device 10 receives the DCI, assuming an example of 4 values, plus a static value or offset k_stat. See table D. The delay values or offsets k_dyn_i may be configured by higher layer signaling from radio network node 12 to the wireless device 10, for example using RRC signaling. The radio network node 12 will not indicate a smaller k_stat+k_dyn_i in the scheduling DCI message than the wireless device 10 has capability to support. If a smaller offset or delay value is anyway received by the wireless device 10, the wireless device 10 may ignore the scheduling message or feed back a NACK. Before the radio network node 12 knows the capability of minimum delay of the wireless device 10, at least one of k_dyn_i is assumed to be equal to k_dyn_0 and k_stat equals k_stat_0 being an example of the default value k_0. k_dyn_0 and k_stat_0 may be given by specifications.

TABLE D

| DCI format Bit field | Scheduling delay k_HARQ |
| --- | --- |
| 00 | k_stat |
| 01 | k_stat + k_dyn_0 |
| 10 | k_stat + k_dyn_1 |
| 11 | k_stat + k_dyn_2 |

Figure 3B:
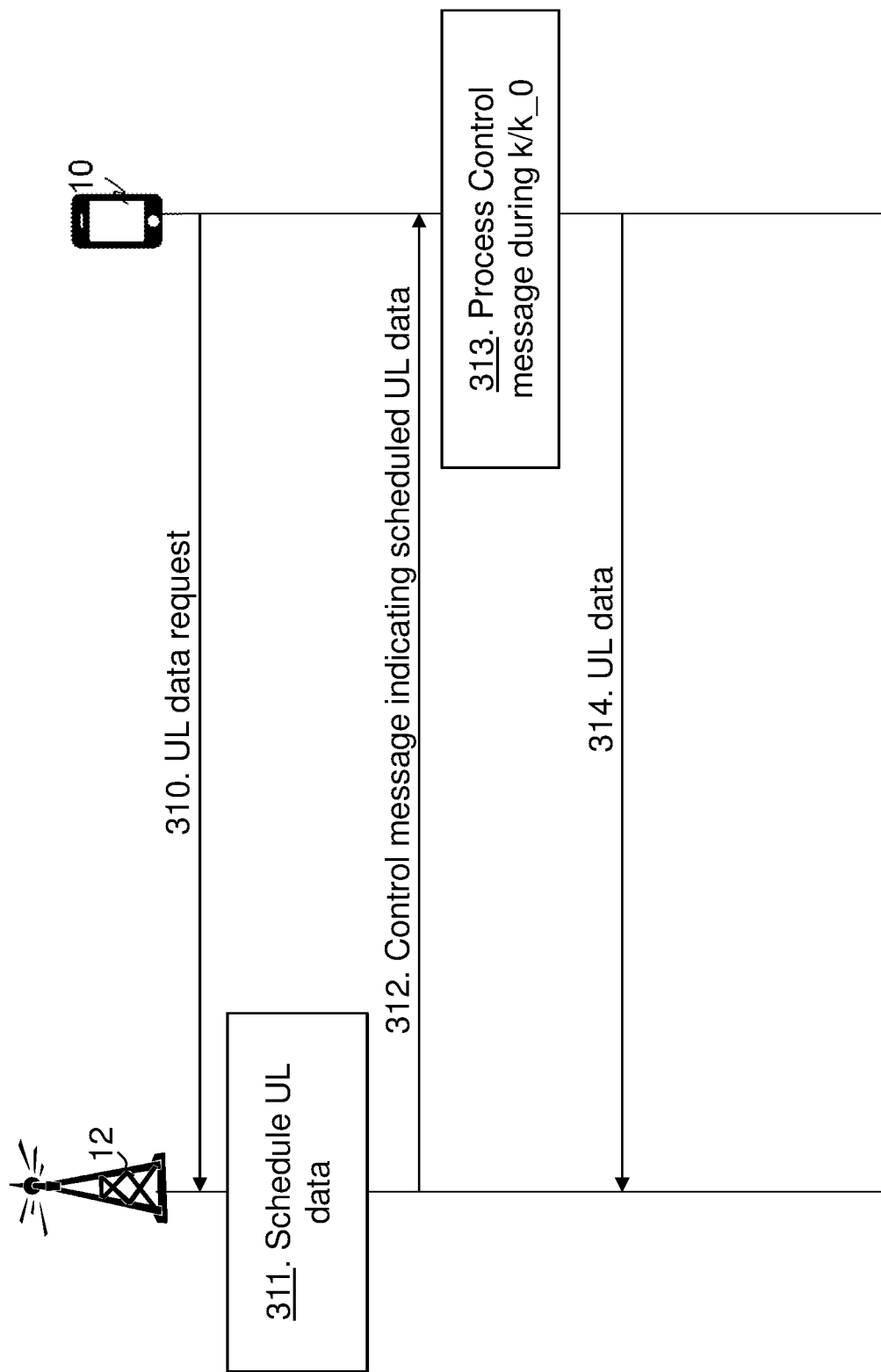
FIG. 3b is a combined flowchart and signalling scheme according to embodiments herein.

FIG. 3b is a combined flowchart and signaling scheme according to an example of embodiments herein for scheduling UL data transmission, i.e. a data transmission over a channel such as PUSCH from the wireless device 10 to the radio network node 12. Actions may be performed in any suitable order.

Action 310.

The wireless device 10 has data intended for the radio network node 12 or for transmission to another node or another wireless device. The wireless device 10 may then transmit an UL data request, e.g. a scheduling request, when data are buffered for transmission at the wireless device 10.

Action 311.

The radio network node 12 schedules resources for carrying the data transmission over the channel from the wireless device 10, UL data. The scheduling is taking the delay value into account. The delay value may either be the default value, k_0, or the dynamical value, the k, taking capability of the wireless device 10 into account.

Action 312.

The radio network node 12 then transmits a control message or information, such as an UL grant, indicating scheduling of resources for carrying the data transmission over the channel from the wireless device 10. The control message may comprise an indication of the delay value, such as a k indication, for the wireless device 10.

Action 313.

The wireless device 10 detects and reads the control message.

Action 314.

The wireless device 10 then transmits UL data, as scheduled, i.e. after the delay value has passed.

Figure 4:
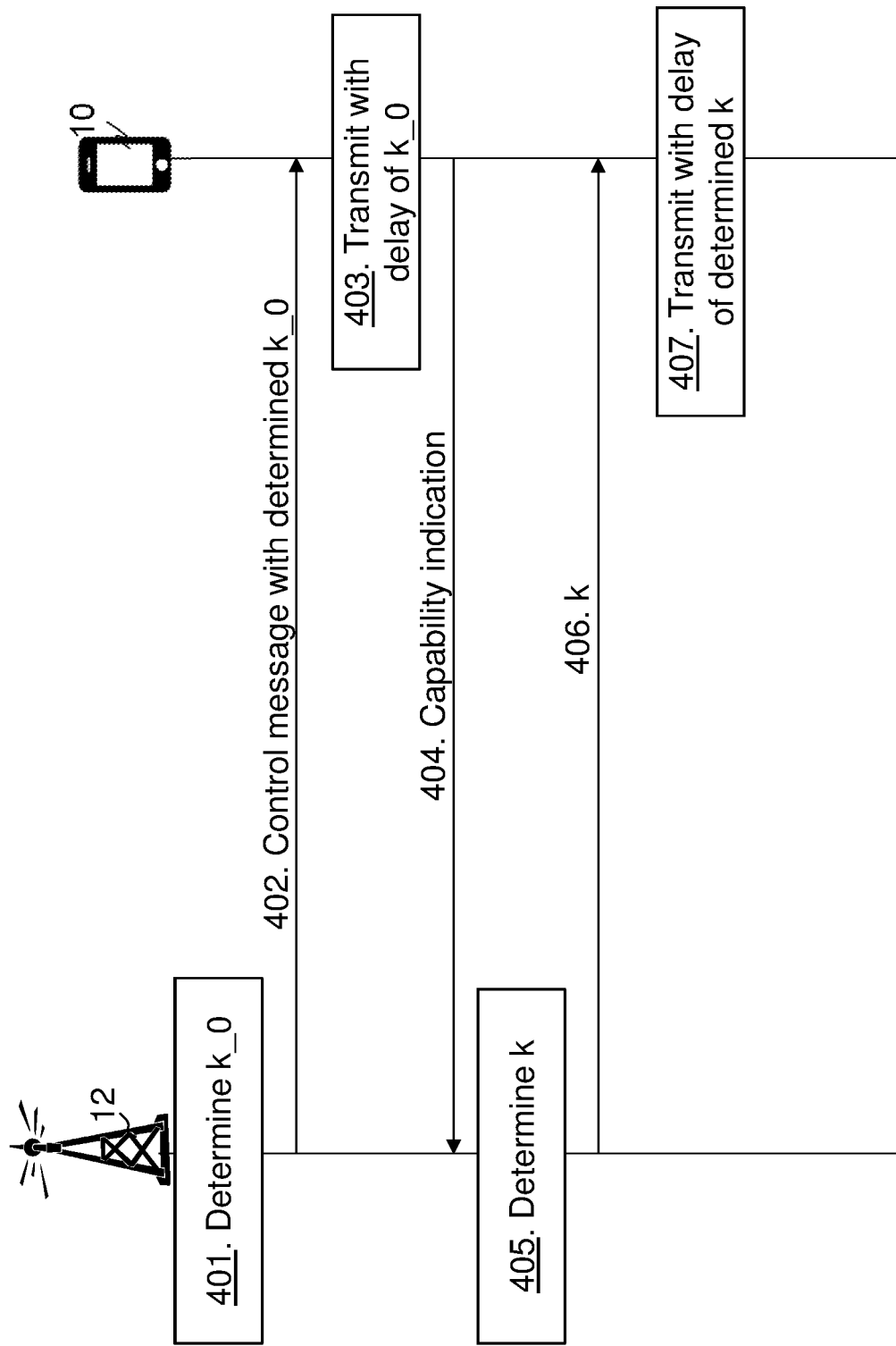
FIG. 4 is a combined flowchart and signalling scheme according to embodiments herein.

FIG. 4 is a combined flowchart and signalling scheme according to embodiments herein.

Action 401.

The radio network node 12 may determine the default value, k_0, for a delay of transmissions from the wireless device 10. E.g. for a given uplink transmission type the default value is set to a nominal value. Thus the default value may be different for different UL transmission types. Uplink transmission types may e.g. be HARQ-ACK/NACK, data transmission on PUSCH, measurement reports, and even data transmissions of different payloads could be defined as different types, e.g. small, medium, large payloads determined by level of payloads and threshold of the levels, and thus data transmissions of different payloads may have different default values.

Action 402.

The radio network node 12 may schedule, i.e. indicate the scheduling in a control message, a data transmission from or to the wireless device 10 and in the control message also indicate the determined default value as scheduled by the radio network node 12. For example, the radio network node 12 may transmit an index value in a table of delay values stored at both the radio network node 12 and the wireless device 10, which index value is selected based on the transmission type.

Action 403.

The wireless device 10 receives the control message and performs a transmission delayed with the indicated delay value, e.g. as indicated by the index value.

Action 404.

The wireless device 10 may then transmit capability, or an indication of capability, a capability indication, of the wireless device 10 to the radio network node 12. E.g. the wireless device 10 may signal the capability indication as an indication of smallest supported delay value, min_k, at the wireless device 10 for processing data. The delay value being related to the processing capability, the higher processing capability the smaller delay value needed.

Action 405.

The radio network node 12 may then determine the delay value based on the received capability indication, set to the adjusted value, k. If capability based delay value for a given transmission type is not used, e.g. UL transmissions, the default value k_0 for that transmission type may be used instead. The default value of the delay value may be given by the standard specifications. For example, the radio network node 12 may schedule HARQ-ACK or PUSCH with a delay equal to or larger than the default value, k_0. In an alternative embodiment, the delay is fixed and equal to the default value, k_0, until adjusted value, k, has been negotiated or agreed upon.

Action 406.

The radio network node 12 may then send the determined delay value, i.e. the dynamic or adjusted value 'k', to the wireless device 10. This may be sent separately or as part of other signaling. E-g—the radio network node 12 may schedule, in a control message, a data transmission from or to the wireless device 10 and in the control message also indicate the determined adjusted value as scheduled by the radio network node 12. For example, the radio network node 12 may transmit an index value in the table of delay values stored at both the radio network node 12 and the wireless device 10, which index value is selected based on the capability of the wireless device 10 indicated by the capability indication.

Action 407.

The wireless device 10 receives the control message and performs a transmission delayed with the indicated delay value, the dynamical value, e.g. as indicated by the index value.

Figure 5:
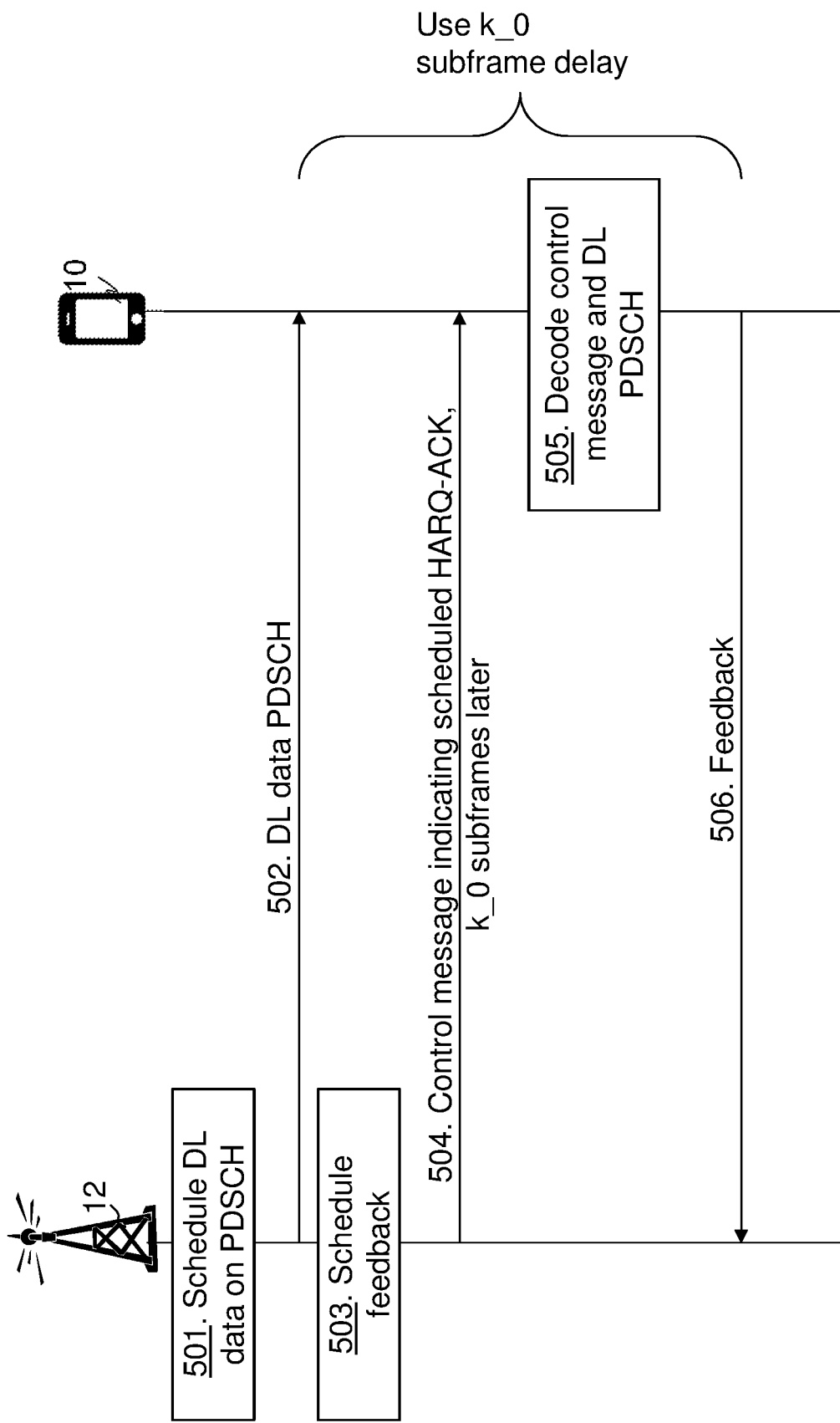
FIG. 5 is a combined flowchart and signalling scheme according to embodiments herein.

FIG. 5 is a combined flowchart and signaling scheme according to embodiments herein. Illustrating a procedure before capability negotiation has occurred or been performed.

Action 501.

The radio network node 12 schedules DL data transmission on PDSCH.

Action 502.

The radio network node 12 then transmits e.g. DL grant with DCI with the scheduled information, DL data on PDSCH.

Action 503.

The radio network node 12 schedules feedback for the DL data transmission on PDSCH.

Action 504.

The radio network node 12 then transmits a control message with the scheduled information for the feedback. The control message indicating e.g. scheduled HARQ-ACK, at least k_0 subframes later than the control message. The control message in Action 502 and 504 may be the same control message, but may also be different control messages. The processing delay is however in any case related to PDSCH so in this case when k in action 504 is defined as relative the control message it may also fulfil some minimum delay relative the PDSCH transmission.

Action 505.

The wireless device 10 decodes or attempts to decode control message and DL PDSCH.

Action 506.

The wireless device 10 transmits feedback of the DL transmission as scheduled. The scheduled transmission are k_0 subframe delayed from reception of the control message.

Figure 6:
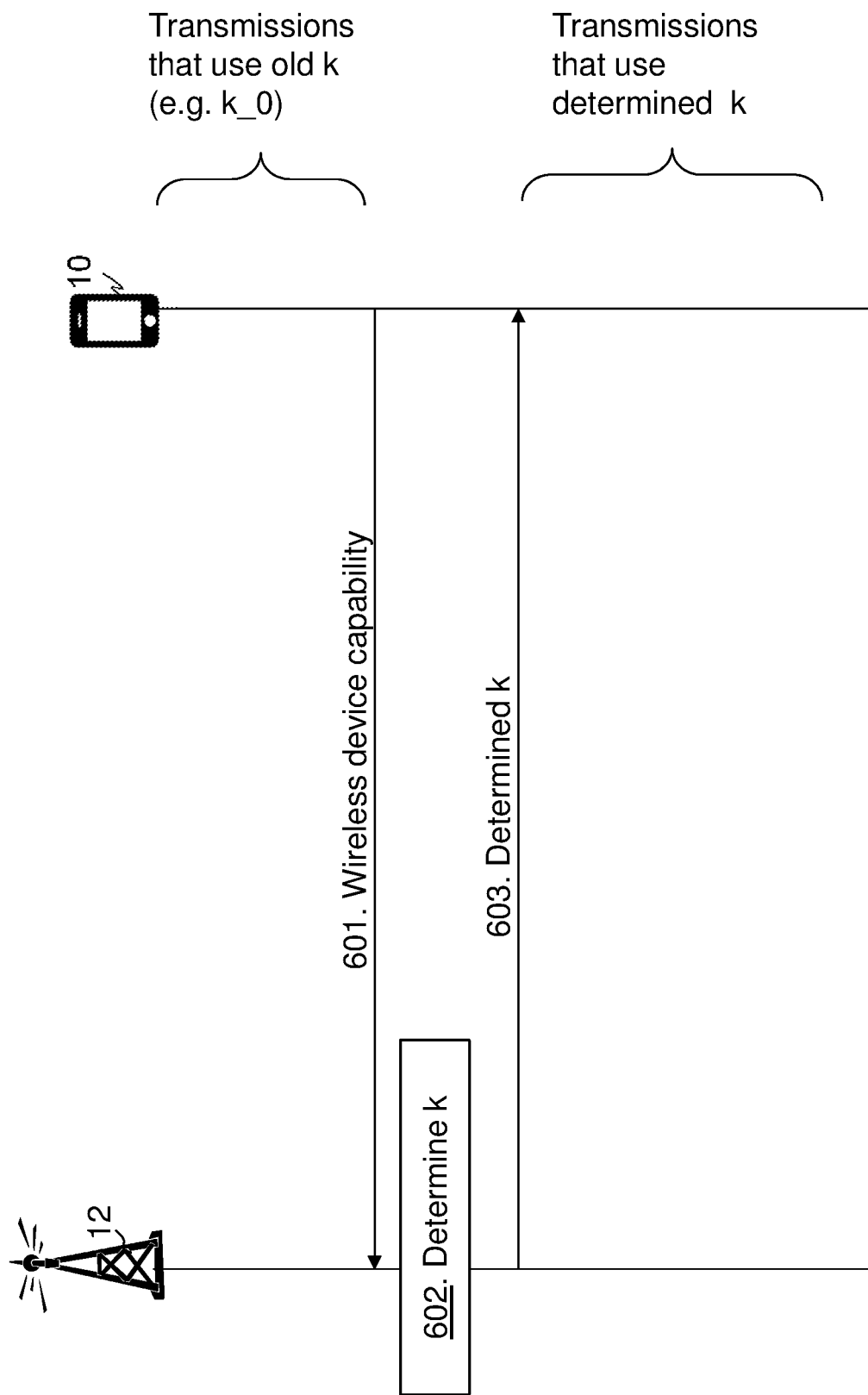
FIG. 6 is a combined flowchart and signalling scheme according to embodiments herein.

FIG. 6 is a combined flowchart and signaling scheme according to embodiments herein. Illustrating when determining the adjusted value, k, using capability negotiation. Transmissions before negotiation use old k-values e.g. k_0.

Action 601.

The wireless device 10 transmits the capability indication indicating its capability, also referred to as wireless device capability, related to the processing time of the wireless device 10.

Action 602.

The radio network node 12 determines the delay value, e.g. the dynamical value, k, based on the received capability.

Action 603.

The radio network node 12 transmits an indication of the determined delay value. Then transmissions from the wireless device 10 use determined delay value k.

Figure 7:
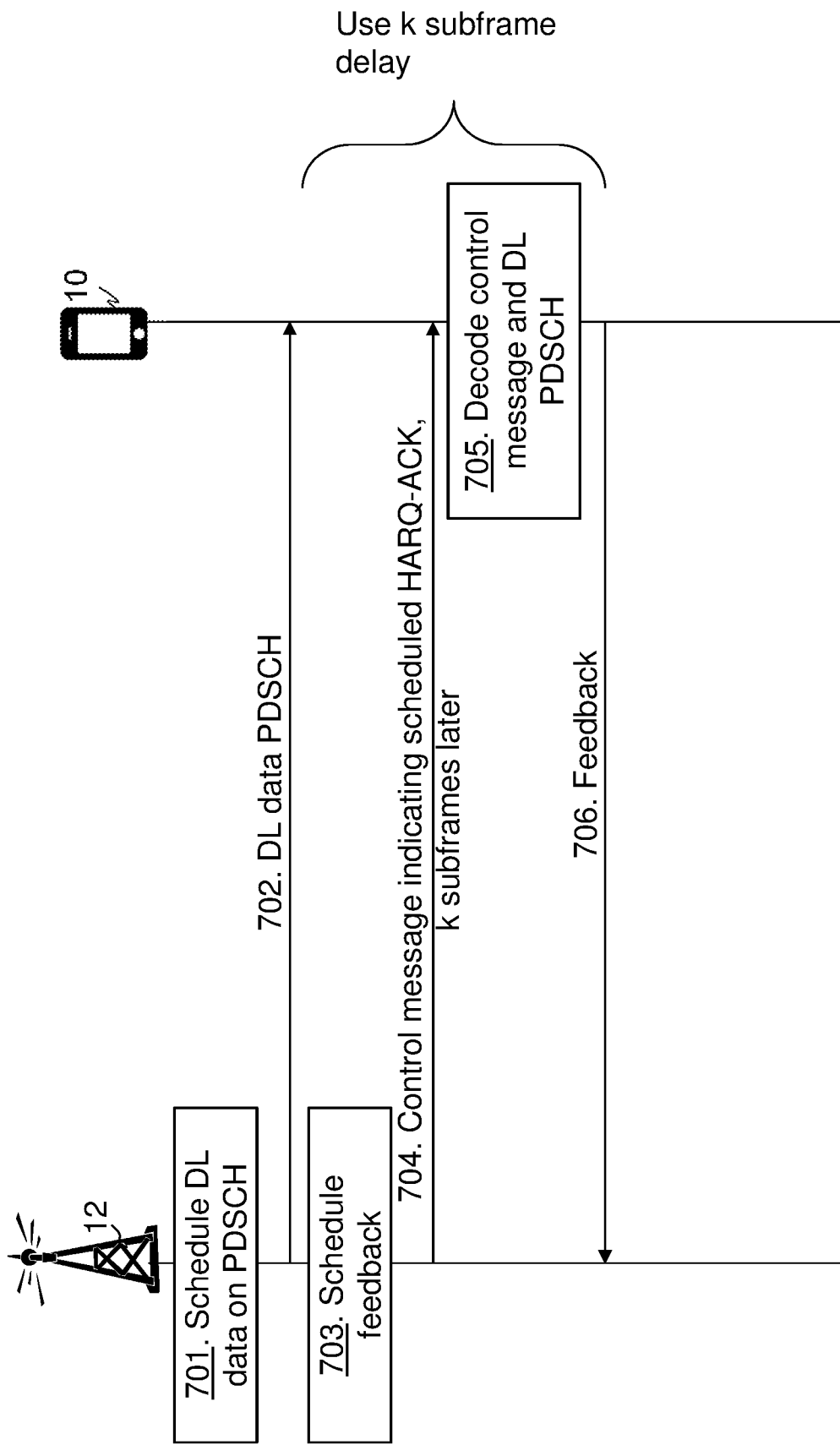
FIG. 7 is a combined flowchart and signalling scheme according to embodiments herein.

FIG. 7 is a combined flowchart and signaling scheme according to embodiments herein. Illustrating a procedure after capability negotiation has occurred or been performed.

Action 701.

The radio network node 12 schedules DL data transmission on PDSCH.

Action 702.

The radio network node 12 then transmits e.g. DL grant with DCI with the scheduled information, DL data on PDSCH.

Action 703.

The radio network node 12 schedules feedback for the DL data transmission on PDSCH.

Action 704.

The radio network node 12 then transmits a control message with the scheduled information for the feedback. The control message indicating e.g. scheduled HARQ-ACK, k number of subframes later, i.e. the delay value, than the control message.

Action 705.

The wireless device 10 decodes or attempts to decode control message and DL PDSCH.

Action 706.

The wireless device 10 transmits feedback of the DL transmission as scheduled. The scheduled transmission are k subframes delayed from reception of the control message as defined by the delay value.

Figure 8:
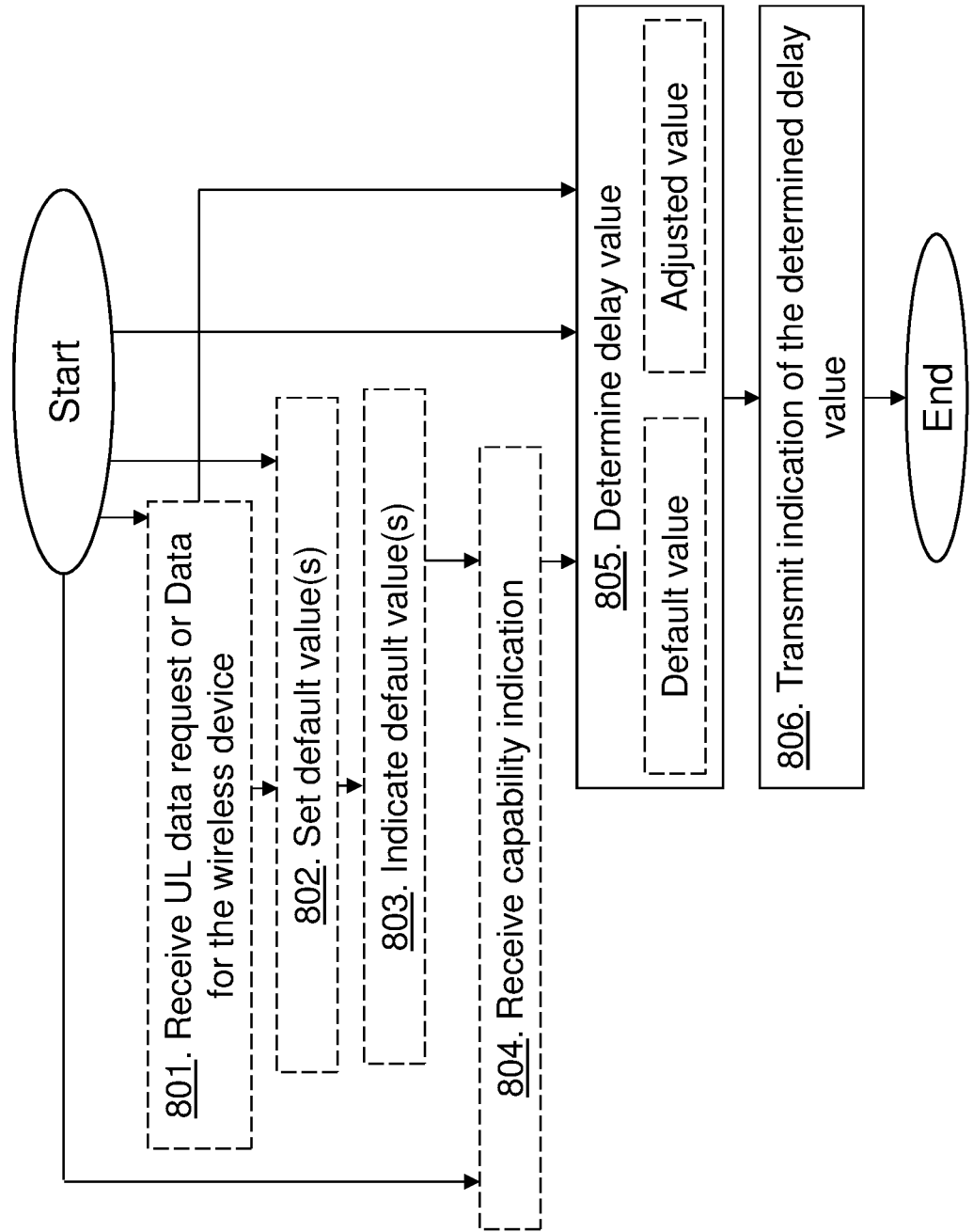
FIG. 8 is a schematic flowchart depicting a method performed by a radio network node according to embodiments herein.

FIG. 8 is a flowchart depicting a method performed by the radio network node 12 for handling transmission of data, such as transmission of data over a subframe or feedback, from the wireless device 10 in the wireless communication network 1. Actions may be performed in any suitable order and optional actions are marked as dashed boxes.

Action 801.

The radio network node 12 may receive an UL data request, a scheduling request for transmitting data, from the wireless device 10 or detect that a buffer level at the radio network node 12 is reached for the wireless device 10 for transmitting data to the wireless device. The radio network node 12 may thus need to schedule a data transmission from the wireless device, either for the UL data or for feedback of the DL data. The data may thus be of a transmission type such as feedback data e.g. HARQ-ACK/NACK, UL data transmission e.g. data over PUSCH, and even data transmissions of different payloads could be defined as different transmission types, e.g. small, medium, large payloads determined by level of payloads and thresholds of the levels.

Action 802.

The radio network node 12 may set a default value as an initial delay value for the wireless device 10 for a transmission of data from the wireless device 10 based on the transmission type of data from the wireless device 10. The radio network node 12 may further set a second default value as a second initial delay value for the wireless device 10 for a second transmission of data from the wireless device 10 based on a second transmission type of data from the wireless device 10.

Action 803.

The radio network node 12 may then indicate the set default value to the wireless device 10 with a default indication. Alternatively or additionally, the radio network node 12 may indicate the set second default value to the wireless device 10 with the default indication or another default indication. Hence, the radio network node may provide different default values for e.g. transmission of uplink data and transmission of HARQ feedback. Different processing functions at the wireless device are used in these two cases.

Action 804.

The radio network node 12 may receive, from the wireless device 10, the capability indication indicating the capability of the wireless device 10. The capability is related to the processing time of the wireless device e.g. for processing received data from the radio network node 12 or processing time for processing data for transmission to the radio network node 12. The capability indication may be the smallest delay value supported by the wireless device 10, denoted as min_k.

Action 805.

The radio network node 12 determines the delay value for a transmission of data from the wireless device based on the transmission type of data from the wireless device 10 or the capability of the wireless device 10. The capability is related to the processing time for processing received data from the radio network node 12, or for processing data for transmission to the radio network node 12. The radio network node 12 determines the delay value for the transmission of data from the wireless device 10 based on the transmission type of data from the wireless device, e.g. for k_min_0. Alternatively or additionally, the radio network node 12 determines the delay value for the transmission of data from the wireless device 10 based on the capability of the wireless device, e.g. based on the received capability indication. The determined delay value may be a default value, such as the k_0, for the wireless device 10 to use as default based on the transmission type of data from the wireless device 10, e.g. different transmission types may have different default values. The determined delay value may additionally or alternatively be a dynamical or adjusted value based on the capability of the wireless device 10 related to the processing time of the wireless device 10 e.g. the indicated capability of the wireless device 10 indicated in the capability indication.

Action 806.

The radio network node 12 then transmits the indication, to the wireless device 10, which indication indicates the determined delay value. The radio network node 12 may configure the wireless device 10 with the delay value. The radio network node 12 may schedule feedback for the DL transmission and transmit a control message with the indication of the determined delay value indicating the scheduling of the feedback. Additionally or alternatively, the radio network node 12 may schedule UL data from the wireless device and transmit a control message with the indication of the determined delay value indicating the scheduling of the UL transmission.

The radio network node 12 may schedule resources for carrying the data transmission over the channel from the wireless device 10, and resources for feedback transmission of a data transmission from the radio network node over the same or different channel.

The capability indication may an index value indicating a set of delay values. Furthermore, the indication and/or the default indication may be an index value of a table mapping the index value to a delay value.

Figure 9:
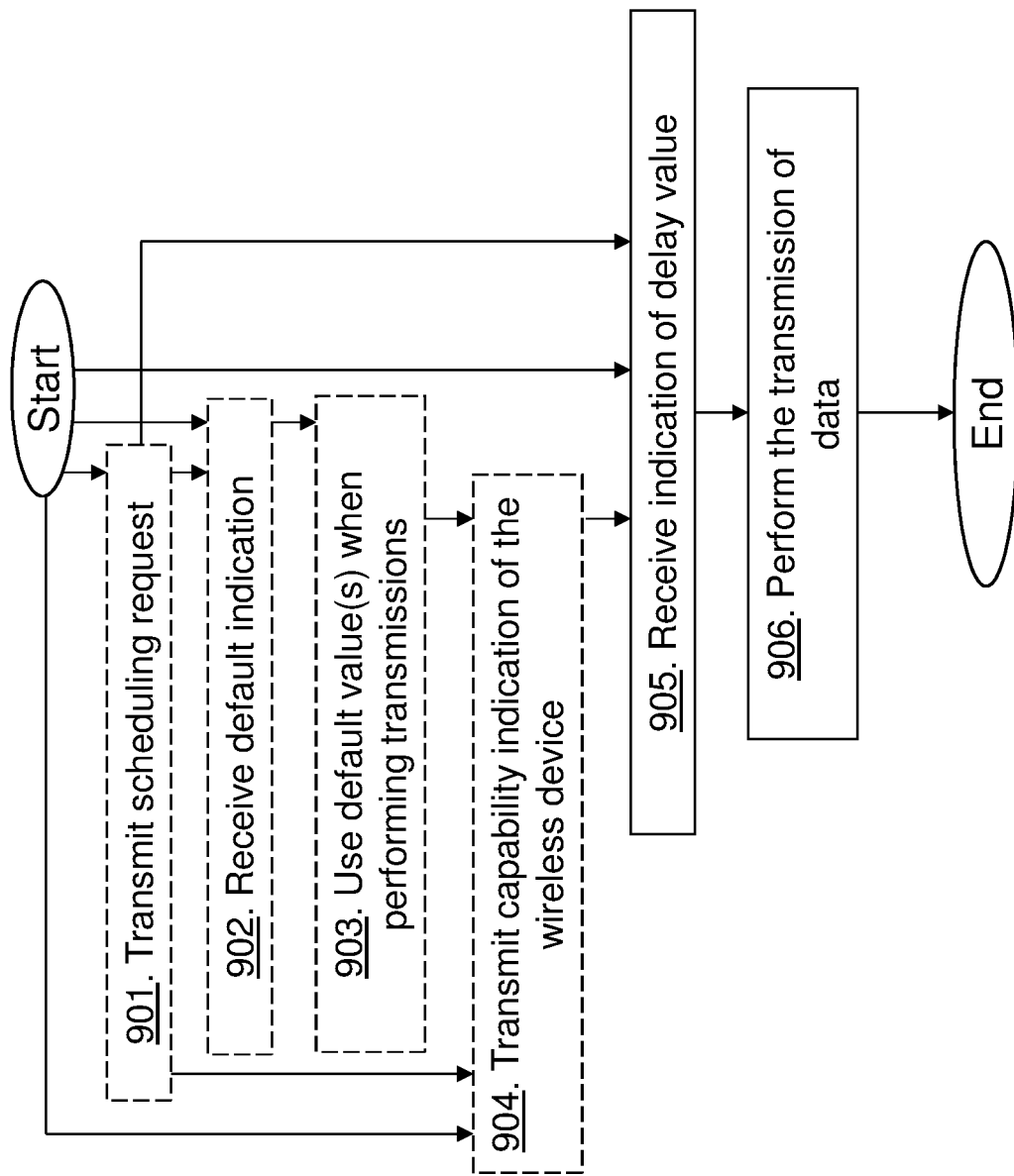
FIG. 9 is a schematic flowchart depicting a method performed by a wireless device according to embodiments herein.

FIG. 9 is a flowchart depicting a method performed by the wireless device 10 for handling the transmission of data in the wireless communication network 1, e.g. a data transmission, UL data or feedback data, to the radio network node 12 in the wireless communication network 1. Actions may be performed in any suitable order and optional actions are marked as dashed boxes.

Action 901.

The wireless device 10 may transmit a scheduling request for UL transmissions.

Action 902.

The wireless device 10 may obtain the default indication indicating the default value of the initial delay value for the wireless device 10 for the transmission of data from the wireless device 10. The default value is based on the transmission type of data from the wireless device 10. The wireless device may further obtain the second default value of the second initial delay value for the wireless device 10 for the transmission of data from the wireless device 10, which second default value is based on the second transmission type of data from the wireless device 10. The wireless device 10 may obtain the default indication from the radio network node 12 or another radio network node or be preconfigured with the default values.

Action 903.

The wireless device 10 may use the default value when performing one or more transmissions of data to the radio network node 12 until receiving the indication indicating the delay value, see action 905, which received indication indicates the delay value for the transmission of data from the wireless device 10 based the capability of the wireless device. Furthermore, the wireless device may use the second default value when performing one or more transmissions of the second transmission type to the radio network node 12.

Action 904.

The wireless device 10 may transmit the capability indication indicating the capability of the wireless device, which capability is related to processing time of the wireless device 10. For example, processing time for processing received data from the radio network node 12 or processing time for processing data for transmission to the radio network node 12. The capability indication may be the smallest delay value supported by the wireless device 10, denoted as min_k. The capability indication may be an index value indicating a set of delay values.

Action 905.

The wireless device 10 receives, from the radio network node 12, the indication indicating the delay value, k-value, for the transmission of data from the wireless device, which delay value is based on the transmission type of data from the wireless device or the capability of the wireless device. The capability is related to the processing time for processing received data from the radio network node 12, or for processing data for transmission to the radio network node 12. Thus, the wireless device gets configured with the delay value from the radio network node. The delay value received may be used in combination with the default value. The wireless device 10 may use the determined delay value but still keep the default value stored, which default value may be used in some case, for example, after radio link failure.

Action 906.

The wireless device 10 then performs the transmission of data delayed based on the received indication, e.g. delayed with the indicated delay value after receiving data from the radio network node.

It should be noted that the indication and/or the default indication may be an index value of a table mapping the index value to a delay value.

Figure 10:
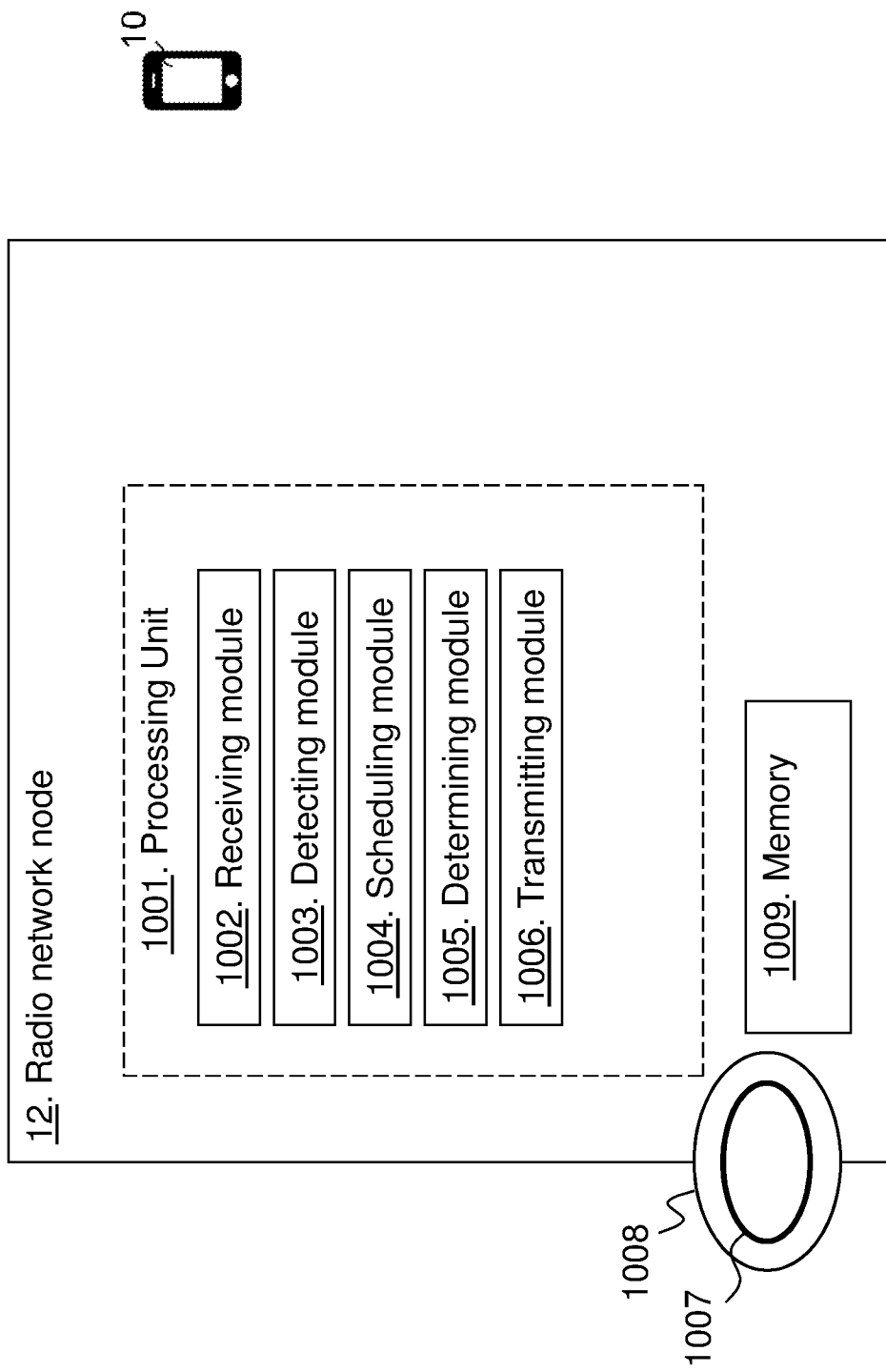
FIG. 10 is a block diagram depicting a radio network node according to embodiments herein.

FIG. 10 is a block diagram depicting the radio network node 12 for handling transmission of data, such as transmission of data over a subframe or feedback, from the wireless device 10 in the wireless communication network 1.

The radio network node 12 may comprise a processing unit 1001, e.g. one or more processors, configured to perform the methods herein.

The radio network node 12 may comprise a receiving module 1002. The radio network node 12, the processing unit 1001, and/or the receiving module 1002 may be configured to receive an UL data request, a scheduling request for transmitting data, from the wireless device 10.

The radio network node 12 may comprise a detecting module 1003. The radio network node 12, the processing unit 1001, and/or the detecting module 1003 may be configured to detect that the buffer level at the radio network node 12 is reached for the wireless device 10 for transmitting data to the wireless device The radio network node 12 may comprise a scheduling module 1004. The radio network node 12, the processing unit 1001, and/or the scheduling module 1004 may be configured to schedule a data transmission from the wireless device, either for the UL data or for feedback of the DL data. The data may thus be of a transmission type such as feedback data e.g. HARQ-ACK/NACK, UL data transmission e.g. data over PUSCH, and even data transmissions of different payloads could be defined as different transmission types, e.g. small, medium, large payloads determined by level of payloads and thresholds of the levels.

The radio network node 12, the processing unit 1001, and/or the receiving module 1002 may be configured to receive, from the wireless device 10, the capability indication indicating the capability related to the processing time of the wireless device 10. The capability is related to processing time for processing received data from the radio network node 12 or processing time for processing data for transmission to the radio network node 12. The capability indication may be the smallest delay value supported by the wireless device 10, min_k. The capability indication may be the index value indicating the set of delay values (supported by the wireless device).

The radio network node 12 may comprise a determining module 1005. The radio network node 12, the processing unit 1001, and/or the determining module 1005 is configured to determine the delay value for the transmission of data from the wireless device 10 based on the transmission type of data from the wireless device, e.g. for k_0. Alternatively or additionally, the radio network node 12 determines the delay value for the transmission of data from the wireless device 10 based on the capability of the wireless device. The capability is related to the processing time for processing received data from the radio network node 12, or for processing data for transmission to the radio network node 12. The determined delay value may be a default value, such as the k_0, for the wireless device to use as default based on the transmission type of data from the wireless device 10, e.g. different transmission types may have different default values. The determined delay value may additionally or alternatively be the dynamical or adjusted value based on the indicated capability of the wireless device 10 related to the processing time of the wireless device 10.

The radio network node 12 may comprise a transmitting module 1006. The radio network node 12, the processing unit 1001, and/or the transmitting module 1006 is configured to transmit the indication, to the wireless device 10. The indication indicates the determined delay value, thus, configures the wireless device 10 with the delay value. The radio network node 12, the processing unit 1001, and/or the scheduling module 1004 may be configured to schedule feedback for the DL transmission and the radio network node 12, the processing unit 1001, and/or the transmitting module 1006 may be configured to transmit a control message with the indication of the determined delay value indicating the scheduling of the feedback. Additionally or alternatively, the radio network node 12, the processing unit 1001, and/or the scheduling module 1004 may be configured to schedule UL data from the wireless device and the radio network node 12, the processing unit 1001, and/or the transmitting module 1006 may be configured to transmit a control message with the indication of the determined delay value indicating the scheduling of the UL transmission. The indication and/or the default indication may be the index value of the table mapping the index value to the delay value.

The radio network node 12, the processing unit 1001, and/or the determining module 1005 may further be configured to set the default value as an initial delay value for the wireless device 10 for a transmission of data from the wireless device 10 based on the transmission type of data from the wireless device 10.

The radio network node 12, the processing unit 1001, and/or the transmitting module 1006 may be configured to indicate the set default value to the wireless device 10 with a default indication.

The radio network node 12, the processing unit 1001, and/or the determining module 1005 may further be configured to the second default value as a second initial delay value for the wireless device 10 for the second transmission of data from the wireless device 10 based on the second transmission type of data from the wireless device 10.

The radio network node 12, the processing unit 1001, and/or the transmitting module 1006 may be configured to indicate the set second default value to the wireless device 10 with the default indication or another default indication.

The radio network node 12, the processing unit 1001, and/or the scheduling module 1004 may be configured to schedule resources for carrying the data transmission over the channel from the wireless device 10, and resources for feedback transmission of a data transmission from the radio network node over the same or different channel.

The methods according to the embodiments described herein for the radio network node 12 are respectively implemented by means of e.g. a computer program 1007 or a computer program product, comprising instructions, i.e., software code portions, which, when executed on at least one processor, cause the at least one processor to carry out the actions described herein, as performed by the radio network node 12. The computer program 1007 may be stored on a computer-readable storage medium 1008, e.g. a disc or similar. The computer-readable storage medium 1008, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

The radio network node 12 further comprises a memory 1009. The memory comprises one or more units to be used to store data on, such as feedback indicators, resources, SRs, DL data, UL/DL Grants, delay values, tables, applications to perform the methods disclosed herein when being executed, and similar.

FIG. 11 is a block diagram depicting the wireless device 10 for handling the transmission of data in the wireless communication network 1 such as a data transmission, UL data or feedback data, to the radio network node 12 in the wireless communication network 1.

The wireless device 10 may comprise a processing unit 1101, e.g. one or more processors, configured to perform the methods herein.

The wireless device 10 may comprise a transmitting module 1102. The wireless device 10, the processing unit 1101, and/or the transmitting module 1102 may be configured to transmit a scheduling request for UL transmissions.

The wireless device 10, the processing unit 1101, and/or the transmitting module 1102 may be configured to transmit the capability indication indicating the capability of the wireless device, which capability is related to processing time of the wireless device 10, e.g. processing time for processing received data from the radio network node or processing time for processing data for transmission to the radio network node. The capability indication may be the smallest delay value supported by the wireless device 10. The capability indication may be the index value indicating the set of delay values e.g. supported by the wireless device 10.

The wireless device 10 may comprise a receiving module 1103. The wireless device 10, the processing unit 1101, and/or the receiving module 1103 is configured to receive the indication from the radio network node 12, which indication indicates the delay value for the transmission of data from the wireless device 10, which delay value is based on the transmission type of data from the wireless device or the capability of the wireless device. The capability is related to the processing time for processing received data from the radio network node 12, or for processing data for transmission to the radio network node 12. Thus, the wireless device gets configured with the delay value from the radio network node. The delay value received may be used in combination with the default value. The wireless device 10 may use the determined delay value but still keep the default value stored, which default value may be used in some case, for example, after radio link failure.

The wireless device 10 may comprise a performing module 1104. The wireless device 10, the processing unit 1101, and/or the performing module 1104 is configured to perform the transmission of data to the radio network node 12 delayed based on the received indication e.g. delayed with the indicated delay value after receiving data from the radio network node.

The wireless device 10, the processing unit 1101, and/or the receiving module 1103 may be configured to obtain the default indication indicating the default value of the initial delay value for the wireless device 10 for the transmission of data from the wireless device 10, which default value is based on the transmission type of data from the wireless device 10.

The wireless device 10, the processing unit 1101, and/or the performing module 1104 may be configured to use the default value when performing one or more transmissions of data to the radio network node 12 until receiving the indication indicating the delay value, and the received indication indicates the delay value for a transmission of data from the wireless device 10 based the capability of the wireless device 10.

The wireless device 10, the processing unit 1101, and/or the receiving module 1103 may be configured to obtain the second default value of the second initial delay value for the wireless device 10 for the transmission of data from the wireless device 10. The second default value is based on the second transmission type of data from the wireless device 10.

The wireless device 10, the processing unit 1101, and/or the performing module 1104 may be configured to use the second default value when performing one or more transmissions of the second transmission type to the radio network node 12.

The indication and/or the default indication may be an index value of the table mapping the index value to a delay value.

The methods according to the embodiments described herein for the wireless device 10 are respectively implemented by means of e.g. a computer program 1105 or a computer program product, comprising instructions, i.e., software code portions, which, when executed on at least one processor, cause the at least one processor to carry out the actions described herein, as performed by the wireless device 10. The computer program 1105 may be stored on a computer-readable storage medium 1106, e.g. a disc or similar. The computer-readable storage medium 1106, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The the wireless device 10 further comprises a memory 1107. The memory comprises one or more units to be used to store data on, such as feedback indicators, resources, SRs, reference signals, UL data, delay values, tables applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a user equipment for performing transmissions of data in a wireless communication network, the method comprising:
   receiving a first indication from a radio network node, wherein the user equipment comprises at least one default delay value and wherein the first indication indicates a first delay value from the at least one default delay value for a transmission of data from the user equipment;
   performing a first transmission of data to the radio network node, wherein a timing of the first transmission is based on the indicated first delay value;
   receiving a control message from the radio network node, wherein the control message comprises information related to at least one second delay value; wherein the information is for configuring a second table in the user equipment, and wherein the second table comprises the at least one second delay value;
   receiving a second indication from the radio network node, wherein the second indication indicates a second delay value from the at least one second delay value for a transmission of data from the user equipment; and
   performing a second transmission of data to the radio network node wherein a timing of the second transmission is based on the indicated second delay value.

2. The method according to claim 1, wherein the control message is a radio resource control (RRC) message.

3. The method according to claim 1, wherein the user equipment comprises a first table comprising the at least one default delay value.

4. The method according to claim 1, further comprising comparing the second delay value with a minimum delay value with which the user equipment is capable of processing data and performing the second transmission, with a timing based on the second delay value, if the second delay value is greater than or equal to the minimum delay value according to said comparing.

5. The method according to claim 1, wherein the first and/or second indication is comprised in a downlink control information.

6. The method according to claim 1, wherein the second indication is indicating an adjusted delay value and the second delay value is based on the first delay value and the adjusted delay value.

7. The method according to claim 1, wherein the first and/or second indication is based on a capability of the user equipment, which capability is related to a processing time for processing received data from the radio network node, or for processing data for transmission to the radio network node.

8. The method according to claim 7, further comprising transmitting, to the radio network node, a capability indication indicating the capability related to the processing time of the user equipment.

9. A method performed by a radio network node for performing transmissions of data in a wireless communication network, the method comprising:
   transmitting a first indication to a user equipment, wherein the user equipment comprises at least one default delay value and wherein the first indication indicates a first delay value from the at least one default delay value for a transmission of data from the user equipment;
   receiving a first transmission of data from the user equipment;
   transmitting a control message to the user equipment, wherein the control message comprises information related to at least one second delay value; wherein the information is for configuring a second table in the user equipment, and wherein the second table comprises the at least one second delay value;
   transmitting a second indication to the user equipment, wherein the second indication indicates a second delay value from the at least one second delay value for a transmission of data from the user equipment; and
   receiving a second transmission of data from the user equipment.

10. The method according to claim 9, wherein the control message is a radio resource control (RRC) message.

11. The method according to claim 9, wherein the user equipment comprises a first table comprising the at least one default delay value.

12. A user equipment comprising processing circuitry and a memory, wherein the processing circuitry is configured to:
   receive a first indication from a radio network node, wherein the user equipment comprises at least one default delay value and wherein the first indication indicates a first delay value from the at least one default delay value for a transmission of data from the user equipment;
   perform a first transmission of data to the radio network node, wherein a timing of the first transmission is based on the indicated first delay value;
   receive a control message from the radio network node, wherein the control message comprises information related to at least one second delay value; wherein the information is for configuring a second table in the user equipment, and wherein the second table comprises the at least one second delay value;
   receive a second indication from the radio network node, wherein the second indication indicates a second delay value from the at least one second delay value for a transmission of data from the user equipment; and
   perform a second transmission of data to the radio network node wherein a timing of the second transmission is based on the indicated second delay value.

13. The user equipment according to claim 12, wherein the control message is a radio resource control (RRC) message.

14. The user equipment according to claim 12, wherein the user equipment is configured with a first table comprising the at least one default delay value.

15. The user equipment according to claim 12, wherein the user equipment is configured to compare the second delay value with a minimum delay value with which the user equipment is capable of processing data and to perform the second transmission, with a timing based on the second delay value, if the second delay value is greater than or equal to the minimum delay value according to said comparing.

16. The user equipment according to claim 12, wherein the first and/or second indication is comprised in a downlink control information.

17. The user equipment according to claim 12, wherein the second indication is indicating an adjusted delay value and the second delay value is based on the first delay value and the adjusted delay value.

18. The user equipment according to claim 12, wherein the first and/or second indication is based on a capability of the user equipment, which capability is related to a processing time for processing received data from the radio network node, or for processing data for transmission to the radio network node.

19. The user equipment according to claim 18, wherein the user equipment is configured to
transmit, to the radio network node, a capability indication indicating the capability related to the processing time of the user equipment.

20. A radio network node comprising processing circuitry and a memory, wherein the processing circuitry is configured to:
transmit a first indication to a user equipment, wherein the user equipment comprises at least one default delay value and wherein the first indication indicates a first delay value from the at least one default delay value for a transmission of data from the user equipment;
receive a first transmission of data from the user equipment;
transmit a control message to the user equipment, wherein the control message comprises information related to at least one second delay value; wherein the information is for configuring a second table in the user equipment, and wherein the second table comprises the at least one second delay value;
transmit a second indication to the user equipment, wherein the second indication indicates a second delay value from the at least one second delay value for a transmission of data from the user equipment; and
receive a second transmission of data from the user equipment.

21. The radio network node according to claim 20, wherein the control message is a radio resource control (RRC) message.

22. The radio network node according to claim 20, wherein the user equipment comprises a first table comprising the at least one default delay value.

23. The radio network node according to claim 20, wherein the first and/or second indication is comprised in a downlink control information.

24. The radio network node according to claim 20, wherein the second indication is indicating an adjusted delay value and the second delay value is based on the first delay value and the adjusted delay value.

25. The radio network node according to claim 20, wherein the first and/or second indication is based on a capability of the user equipment, which capability is related to a processing time for processing received data from the radio network node, or for processing data for transmission to the radio network node.

26. The radio network node according to claim 25, wherein the radio network node is configured to:
receive, from the user equipment, a capability indication indicating the capability related to the processing time of the user equipment; and wherein the capability indication is used in determining the second delay value.

* * * * *